(12) United States Patent
Sachs et al.

(10) Patent No.: US 6,354,361 B1
(45) Date of Patent: *Mar. 12, 2002

(54) TOOLING HAVING ADVANTAGEOUSLY LOCATED HEAT TRANSFER CHANNELS

(75) Inventors: Emanuel Sachs, Newton; Steven P Michaels, Carlisle; Samuel M. Allen, Jamaica Plain, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/654,172

(22) Filed: Sep. 1, 2000

Related U.S. Application Data

(60) Continuation of application No. 09/109,462, filed on Jul. 2, 1998, now Pat. No. 6,112,804, which is a division of application No. 08/551,012, filed on Oct. 31, 1995, now Pat. No. 5,775,402.

(51) Int. Cl.$^7$ .............................................. B22D 27/04
(52) U.S. Cl. ...................................... 164/128; 164/122
(58) Field of Search ................................. 164/122, 348, 164/132, 98, 126, 128; 249/135, 111, 79, 80

(56) References Cited

U.S. PATENT DOCUMENTS

| | | | |
|---|---|---|---|
| 2,671,741 A | 3/1954 | Duvall | 134/2 |
| 2,985,939 A | 5/1961 | Brockman | 25/157 |
| 3,302,655 A | 2/1967 | Sasaki et al. | 134/79 |
| 3,451,401 A | 6/1969 | Levinson | 134/58 |
| 3,868,267 A | 2/1975 | Gazza et al. | 117/22 |
| 3,887,392 A | 6/1975 | Tang | 134/1 |
| 3,990,906 A | 11/1976 | Johnson et al. | 134/1 |
| 3,999,188 A | 12/1976 | Yamada | 346/75 |
| 4,122,458 A | 10/1978 | Paranjpe | 346/75 |
| 4,129,875 A | 12/1978 | Ito et al. | 346/75 |

(List continued on next page.)

FOREIGN PATENT DOCUMENTS

| | | | |
|---|---|---|---|
| DE | 2263777 | 7/1973 | |
| DE | 4005870 A1 | 8/1991 | |
| EP | 0431924 A2 | 6/1991 | |
| EP | 446934 | 9/1991 | 164/97 |
| EP | 0446934 A2 | 9/1991 | |

(List continued on next page.)

OTHER PUBLICATIONS

R. Sweet, "High–Frequency Recording with Electrostatically Deflected Ink Jets", *The Review of Scientific Instruments*, vol. 36 No. 2, pp. 131–136, 1965.

C. Deckard, et al., "Solid Freeform Fabrication and Selective Powder Sintering", NAMRC Proceedings, Symposium #15, undated.

H. Kodama, "Automatic Method for Fabricating a Three–Dimensional Plastic Model with Photo–Hardening Polymer", *Review of Scientific Instruments*, vol. 52, No. 11, Nov. 1981.

(List continued on next page.)

*Primary Examiner*—Kuang Y. Lin
(74) *Attorney, Agent, or Firm*—Steven J. Weissburg

(57) ABSTRACT

Processes for providing enhanced thermal properties of tooling, particularly metal and metal/ceramic molds, made by solid free form fabrication techniques, such as the three dimensional printing process, and the tooling made by these processes are disclosed. The methods of enhancing thermal properties include incorporating integral contour coolant channels into the mold, adding surface textures to the coolant channels, creating high thermal conductivity paths between the surfaces and the coolant channels, and creating low thermal inertia regions in the mold.

2 Claims, 9 Drawing Sheets

U.S. PATENT DOCUMENTS

| | | | |
|---|---|---|---|
| 4,158,204 A | 6/1979 | Kuhn et al. | 346/75 |
| 4,235,246 A | 11/1980 | Weiss | 128/785 |
| 4,247,508 A | 1/1981 | Housholder | 264/219 |
| 4,294,805 A | 10/1981 | Hodgson et al. | 423/4 |
| 4,299,239 A | 11/1981 | Weiss et al. | 128/785 |
| 4,420,446 A | 12/1983 | Wieder et al. | 264/40.6 |
| 4,472,668 A | 9/1984 | Mutschler et al. | 318/568 |
| 4,504,322 A | 3/1985 | Adwalpalker et al. | 134/1 |
| 4,561,902 A | 12/1985 | Lee | 134/1 |
| 4,575,330 A | 3/1986 | Hull | 425/174.4 |
| 4,579,380 A | 4/1986 | Zaremsky et al. | 294/119.1 |
| 4,636,341 A | 1/1987 | Murley | 264/37 |
| 4,642,653 A | 2/1987 | Ito et al. | 346/1.1 |
| 4,665,492 A | 5/1987 | Masters | 364/468 |
| 4,675,216 A | 6/1987 | DuForest et al. | 427/56.1 |
| 4,791,022 A | 12/1988 | Graham | 428/324 |
| 4,791,434 A | 12/1988 | Wills | 346/75 |
| 4,818,562 A | 4/1989 | Arcella et al. | 427/53.1 |
| 4,863,538 A | 9/1989 | Deckard | 156/62.2 |
| 4,876,455 A | 10/1989 | Sanderson et al. | 250/560 |
| 4,929,402 A | 5/1990 | Hull | 264/22 |
| 4,935,055 A | 6/1990 | Aghajanian et al. | 164/97 |
| 4,988,202 A | 1/1991 | Nayar et al. | 356/394 |
| 5,016,683 A | 5/1991 | Latka | 141/1 |
| 5,031,483 A | 7/1991 | Weaver | 76/107 |
| 5,053,090 A | 10/1991 | Beaman et al. | 156/62.2 |
| 5,059,266 A | 10/1991 | Yamane et al. | 156/64 |
| 5,076,869 A | 12/1991 | Bourell et al. | 156/62.2 |
| 5,079,974 A | 1/1992 | Weiss et al. | 76/107.1 |
| 5,121,329 A | 6/1992 | Crump | 364/468 |
| 5,126,529 A | 6/1992 | Weiss et al. | 219/121.6 |
| 5,136,515 A | 8/1992 | Helinski | 364/468 |
| 5,147,587 A | 9/1992 | Marcus et al. | 264/22 |
| 5,189,781 A | 3/1993 | Weiss et al. | 29/527.2 |
| 5,203,944 A | 4/1993 | Prinz et al. | 156/247 |
| 5,204,055 A | 4/1993 | Sachs et al. | 419/2 |
| 5,207,371 A | 5/1993 | Prinz et al. | 228/125 |
| 5,278,442 A | 1/1994 | Prinz et al. | 257/417 |
| 5,281,789 A | 1/1994 | Merz et al. | 219/76.15 |
| 5,286,573 A | 2/1994 | Prinz et al. | 428/457 |
| 5,301,415 A | 4/1994 | Prinz et al. | 29/458 |
| 5,301,863 A | 4/1994 | Prinz et al. | 228/33 |
| 5,312,456 A | 5/1994 | Reed et al. | 411/456 |
| 5,340,656 A | 8/1994 | Sachs et al. | 428/546 |
| 5,387,380 A | 2/1995 | Cima et al. | 264/69 |

FOREIGN PATENT DOCUMENTS

| | | | |
|---|---|---|---|
| EP | 0470705 A2 | 12/1992 | |
| EP | 0578058 A2 | 1/1994 | |
| JP | 54-9132 | 4/1979 | 164/97 |
| JP | 2111528 | 4/1990 | |
| JP | 2307737 | 12/1990 | |
| JP | 4061328 | 2/1992 | |
| WO | WO9003893 | 4/1990 | |
| WO | WO9220505 | 11/1992 | |

OTHER PUBLICATIONS

T. Wohlers, "Creating Parts by the Layers", *Cadence*, pp. 73–76, Apr. 1989.

Database WPI, Section PQ, Week 9103, Derwent Publications Ltd., London, GB; Class P, p. 43, AN 91–020238 & SU–A–1 563 787 (Suchov, A.G.), May 15, 1990.

TOOLING HAVING ADVANTAGEOUSLY LOCATED HEAT TRANSFER CHANNELS

This application is a continuation of application 09/109,462, a continued prosecution application filed on Aug. 5, 1999, originally filed on Jul. 2, 1998, now U.S. Pat. No. 6,112,808 which is a divisional of 08/551,012, filed on Oct. 31, 1995 now U.S. Pat. No. 5,775,402, This invention was made with government support under grants number DDM-8913977 and 9215728-DDM awarded by the National Science Foundation. The government has certain rights in the invention.

FIELD OF THE INVENTION

This invention relates to the field of tooling manufacture by layered fabrication techniques and more particularly to three dimensional printing of metal and metal/ceramic molds.

BACKGROUND OF THE INVENTION

Metal molds for forming processes such as injection molding, blow molding, die casting, forging, and sheet metal forming are currently made using manufacturing techniques such as machining, EDM, casting and electroforming. (K. Stoeckhert (ed.), "Mold Making Handbook for the Plastics Engineer," Oxford University Press, New York, N.Y. 1983.) The creation of the tool is a multi-step process involving a variety of manufacturing techniques. The mold is created by removing material from a block of metal, usually a tool material such as tool steel. Typically, a block of annealed tool steel is first rough machined to near-net shape. The near-net shape tool may then be hardened with an appropriate heat treatment cycle to obtain the desired final material properties. Final dimensions are obtained by finish machining, grinding or EDM of the mold pieces. Final finishing may also occur before the hardening step. Selected tool surfaces are then modified as required. Mating surfaces are typically ground to provide adequate sealing. Surfaces which require additional hardness or abrasion resistance can be treated by techniques such as nitriding, boriding, plating or ion implantation. (K. Stoeckhert (ed.), "Mold Making Handbook for the Plastics Engineer," Oxford University Press, New York, N.Y. 1983.)

Alternate techniques exist for creating the near-net shape tool pieces, such as casting or electroplating. Near-net shape tool ingots made by casting are produced using established casting techniques. After casting, the metal perform must be finished using the additional finish machining or EDM processes described above. Tool performs made by electroforming are produced by electroplating a metal, typically nickel, onto an appropriately shaped mandrel. After plating to sufficient thickness, the tool is removed from the mandrel. Although the face of the tool is completely defined by the electroforming process, other portions of the tool must be created using other processes. A backing material, such as metal-filled epoxy, must be added to the rear of the tool and machined to the appropriate shape before the tool can be used. An alternate method of producing metal tools, the Tartan Tooling method, is described in U.S. Pat. No. 4,431,449 and U.S. Pat. No. 4,455,354. In this method, metal powder is packed around a negative of the shape to be produced and bonded with a polymeric material. The negative can be produced by any convenient means. The bonded powder green part is then fired to remove the polymer and to partially sinter the part. Finally, the porous sintered part is infiltrated with a lower melting point alloy to fill the residual porosity, producing a fully dense metal tool. Tools produced by the Tartan Tooling method have fewer finishing requirements than near-net shape performs made by other processes, but some finishing is usually required.

Metal molds, tools and dies produced by the above techniques must meet a variety of performance requirements. These requirements are determined by the type of forming processes the mold will be used for. Tools used for injection molding, for example, must remove heat from the injected part to cool it and freeze its shape. The transfer of heat away from the molten plastic directly affects part cycle time, dimensional accuracy and material properties. (K.Stoeckhert (ed.), "Mold Making Handbook for the Plastics Engineer," Oxford University Press, New York, N.Y. 1983.) Molds with poor heat transfer characteristics require longer waiting periods before the plastic part has solidified enough to be ejected without damage, thus increasing cycle time. Molds in which the polymer freezes non-uniformly due to uneven heat removal can result in anisotropic shrinkages across the part, causing part warpage and loss of dimensional control. Additionally, residual stresses are incorporated into the plastic part during uneven cooling, having a detrimental effect on the material properties of the part. Injection molds typically incorporate fluid coolant channels to increase the rate at which heat can be removed from the injected plastic. (R. G. W. Pye, "Injection Mould Design," 4th ed., Longman Scientific and Technical, Essex, England, 1989.) The coolant channels are incorporated into the mold using traditional machining or EDM techniques. The layout of the coolant channels is dependent on part geometry and the specific limitations of the processes used to create the channels.

Cooling of a tool can be effected in one of two ways. For smaller parts in which a tooling insert mold 1 is used, as shown in FIG. 1, the coolant channels 2 are located in the backing plate assembly 3, which also provides the majority of the mechanical support necessary to resist mold deflection during the injection cycle. (H. Gastrow, "Injection Molds: 102 Proven Designs," Hanser Publishers, Munich, 1983.) Channels are not directly incorporated into the insert itself because of the additional expense and fabrication time. Also, the size of channels for insert molds may be prohibitively small, making fabrication difficult. For larger, non-insert type molds 4, shown in FIG. 2, the coolant channels 5 are directly incorporated into the mold. In both cases, the location and configuration of the coolant channel layout is a compromise between ideal cooling and practical limitations. For insert molds, the backing plate coolant channel layout is not tailored to a specific insert mold but is designed with a generic layout, and therefore cannot meet the ideal coolant needs of a particular insert geometry. Additionally, the heat flux transferred from the mold insert to the coolant plate must pass through the gap between the insert and plate surfaces. Although this gap is usually filled with a heat conductive grease or other material, the overall heat transfer is lessened. For larger molds 9, shown in FIG. 3, the coolant channels are usually arrays of straight cylindrical holes 10 which are made using standard machining procedures. The channels are incorporated into the mold as an additional mold fabrication step after the mold cavity or core has been defined. The actual layout of the channels is limited by the shape of the cavity or core, in addition to fabrication constraints. The simple straight cylindrical channels cannot follow the complex contours of a typical cavity or core, resulting in uneven cooling of the mold surfaces. Also, the number and placement of the channels cannot be allowed to compromise the mechanical integrity of the mold. Also, rework of coolant channels, as might be required if the initial configuration does not perform adequately, becomes increasingly difficult as more mold material is removed. Improper layout of the channels may require the entire mold to be scraped.

The cylindrical holes are usually created by drilling. The cylindrical shape of the coolant channel is therefore a consequence of the manufacturing technique used to create it and not because it is the ideal shape for heat transfer purposes. The internal surface area of the channel, which directly effects the overall heat transfer from mold metal to coolant, is limited by this requisite cylindrical shape. Increasing channel diameter or the number of channels in the mold are ways to increase the effective channel wall surface area, but these techniques are limited by mold geometry. Other methods of increasing heat transfer which are commonly found in heat exchanger design, such as finned or textured surfaces, are not readily adaptable to mold coolant channels made by conventional means.

Most tool steel alloys are tailored for high strength, hardness and toughness in order to survive millions of injection cycles. Tool steels typically have fair to poor thermal conductivity values compared to other softer tooling alloys, specifically copper alloys, although the copper alloys cannot match the strength and hardness of tool steel. Since the components of injection molding tools are made almost exclusively from a single material, a compromise has to be made with regard to either high strength or high thermal conductivity properties. In some very complicated, multi-component tools, different parts of the tool can be made from different alloys. For example, a tool steel mold core 15 with a high aspect ratio can be drilled out and a dowel pin 16 made from high thermal conductivity metal can be inserted to provide an enhanced heat transfer path to an adjacent coolant channel 17, as shown in FIG. 4. Tool modifications of this type can only be used in a limited set of geometries and add to the complexity of fabrication and cost of the tool.

Most injection molds are actively cooled so that heat will be removed quickly from the injected plastic, allowing for faster plastic solidification and decreased cycle times. The coolant fluid supplied to the mold is at a preset temperature. Regardless of the temperature chosen, however, a compromise invariably results between finished part quality and cycle time. If a high coolant temperature is chosen, the finished part will have low internal stress and good dimensional accuracy. Cycle time, however, is lengthened due to the slow cooling. If a low coolant temperature is chosen, the cycle time is reduced due to faster cooling, but the rapid and potentially non-uniform freezing results in parts of lesser quality. A method for simultaneously achieving low cycle time and high part quality would involve rapidly heating the mold by electrical resistance just before injection, and then rapidly cooling the mold after injection to decrease cycle time. (B. H. Kim, "Low Thermal Inertia Injection Molding," MIT Ph.D. Thesis, 1983.)

Metal molds for forming processes can also be created directly from a computer model using processes that construct objects in layers, such as the three dimensional printing process described for example in U.S. Pat. Nos. 5,204,055, 5,340,656, and 5,387,380. In a typical application of this process, the mold is created by spreading a powder layer using a roller within a confined region as defined by a piston and cylinder arrangement. A water soluble polymer is then deposited at specific regions of the layer as determined by a computer model of the mold. The water soluble polymer acts to bind the powder within the layer and between layers. This process is repeated layer after layer until all layers needed to define the mold have been printed. The result is a bed of powder which contains within it a polymer/metal composite of the desired geometry. Unbound powder temporarily supports unconnected portions of the component, allowing overhangs, undercuts and internal volumes to be created. Next, the entire bed is heated to a temperature sufficient to cure the polymer and bind the printed regions together. The mold is then removed from the loose, unprinted powder to provide a green metal mold. A variety of post-processing options exist for transforming the three dimensional printed green metal mold into a fully dense, all metal part. The polymeric binder must first be removed by thermal decomposition in a process called debinding. One method of debinding is accomplished by firing the part in a non-oxidizing atmosphere at temperatures in excess of 500° C. (R. M. German, "Powder Injection Molding," Metal Powder Industries Federation, Princeton, N.J., 1990.) After debinding, additional processing is performed to fully density the part. For example, the debound part is directly sintered to full density using a heating schedule appropriate to obtain full densification by sintering. In this approach, debinding and sintering can occur in a single continuous operation. Another means of obtaining full density is to sinter the metal skeleton after debinding such that only part of the porosity is eliminated. Again, debinding and sintering can occur in a single continuous operation. In a second firing operation, the metal skeleton is infiltrated with a Lower melting point alloy, thereby filling the residual porosity with infiltrant metal. The amount of sintering required before infiltration will depend on the infiltration alloy and infiltration temperature. The sintered metal skeleton must be strong enough to resist the capillary forces induced by the liquid infiltrant. Typically, sintered densities in excess of 65% of theoretical are sufficient. Typically, the green part would be printed at about 60% theoretical density and sintered to 65% theoretical density.

SUMMARY OF THE INVENTION

The current invention provides tooling, particularly metal and ceramic/metal molds, produced by solid free form fabrication techniques with unique thermal features and properties. The invention is particularly suited for use with three dimensional printing techniques.

According to one aspect of the invention, molds are made with internal contour cooling channels which are incorporated into the mold during the printing process. There are no restrictions on the number, size, shape and routing of these channels. The internal channels can be printed so as to be completely open, or they can be filled with a porous material. The shape and texture of the cooling channel walls can be optimized for high heat transfer by increasing channel surface area and modifying channel surface texture. For example, the channels can incorporate thermal structures such as fins to increase surface area to enhance heat transfer. The surface texture of the internal channels can be controlled by the selection of the powder and binder used to print the green part.

During fabrication of the mold, the cooling channels can be left open during the infiltration step by creating a pressure differential between ambient and the infiltrant melt front, such as by placing the mold on stilts of a predetermined minimum height through which the infiltrant rises by capillary action. Also, by printing an "infiltration stop" material in appropriate regions of the tool volume, the cooling channels can be left open after the infiltration step of post-processing.

In another aspect of the invention, internal cellular structures, preferably in combination with cooling channels, are created beneath the mold surface during printing. The thermal inertia of the mold is reduced by such a cellular structure, allowing for rapid thermal cycling of the mold.

The invention also provides enhanced thermal properties created by the selective deposition of high thermal conductivity materials, thereby increasing heat transfer from the tool surface to the coolant channels. For example, high thermal conductivity paths can be created between the mold surfaces and the coolant channels. Selective printing of high thermal conductivity materials additionally allows the creation of gradual compositional gradients within the tool, thereby minimizing local stresses caused by the local variation in coefficient of thermal expansion and increasing the overall toughness of the tool.

Buried pockets of a high thermal conductivity material can also be provided by incorporating a pocket open on one end during the printing process, removing unbound powder from the pocket through the open end, sealing the open end, and infiltrating the part with an infiltrant of a high thermal conductivity material to fill the pocket.

DESCRIPTION OF THE DRAWINGS

The invention will be more fully understood from the following detailed description taken in conjunction with the accompanying drawings in which.

DETAILED DESCRIPTION OF THE INVENTION

The present invention provides for the enhancement of thermal properties of tooling used in a variety of processes, such as injection molding, thermoforming, blow molding, die casting, resin transfer molding, reaction injection molding, sheet metal forming, transfer molding, forging, and others. The tooling is manufactured by a solid free form fabrication technique (SFF) from a computer aided design (CAD), as in the three dimensional printing process.

Figure 1:
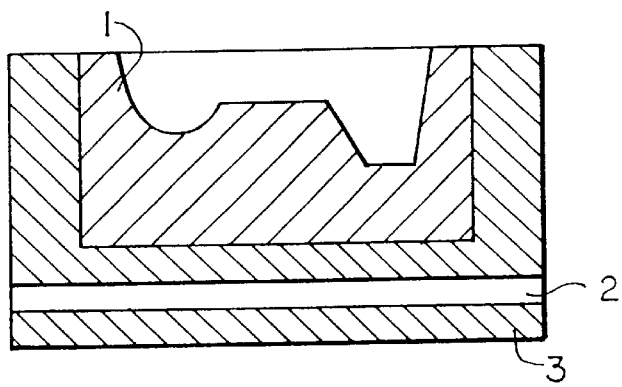
FIG. 1 is a schematic illustration of a prior art insert mold and backing plate incorporating coolant channels.
Figure 2:
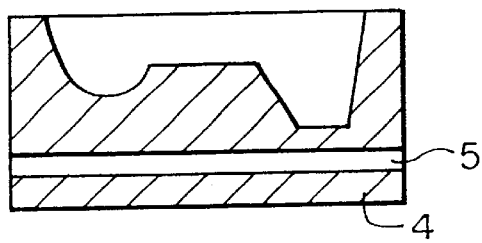
FIG. 2 is a schematic illustration of a prior art mold incorporating coolant channels.
Figure 3:
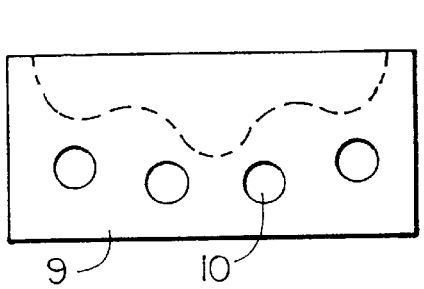
FIG. 3 is a schematic illustration of a prior art mold showing cylindrical coolant channels.
Figure 4:
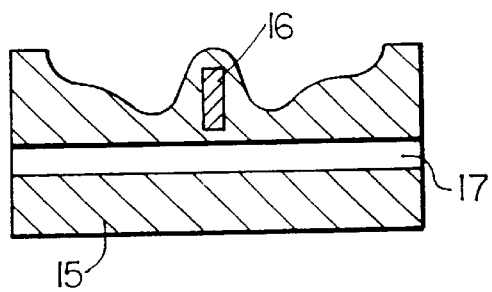
FIG. 4 is a schematic illustration of a prior art mold including a high thermal conductivity dowel pin.
Figure 5:
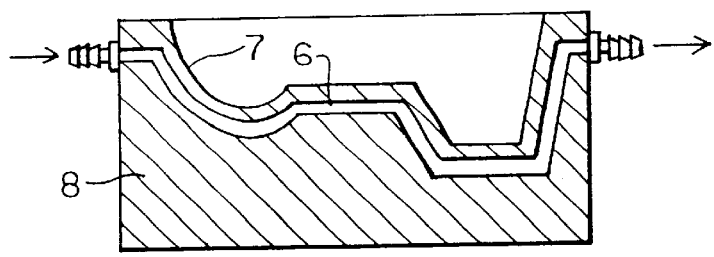
FIG. 5 is a schematic illustration of a mold incorporating contour coolant channels according to the present invention.

In a first embodiment, as shown in FIG. 5, a mold 8 is fabricated with integral conformal cooling channels or passages 6 incorporated directly into a mold 8. The channels advantageously may follow the contour of, or conform to, the surface of the mold. These conformal channels can be of arbitrary shape, size, and complexity. They can be made in any cross section and are not limited to round sections as are drilled passages. In some cases, non-circular cross sections arranged with a greater perimeter length close to the mold surface are advantageous to present more coolant close to the surface of the molding cavity. For example, the cross section can be elliptical with the long axis generally parallel to the mold surface. The channels are open on both ends and extend from one edge of the mold to another edge to provide an inlet and an outlet for a coolant to flow therethrough during molding of a part. The channels can take a variety of paths through the mold and can include branched or interconnected configurations. Many channels can be spaced close together to provide more cooling. Such techniques are well suited to both the cavity side of an injection mold and to the core side. In fact, in the absence of such conformal cooling, cores are particularly difficult to cool.

The design of the channels is written into a CAD model of the mold during the mold design process. During fabrication of the mold, as by three dimensional printing, a powder material is deposited in layers, and a polymer or inorganic binder is selectively printed on each layer. The powder material may include stainless steels, such as the 400 series and particularly 420, tool steels such as H13 or S7, or carbides, such as tungsten carbide, titanium carbide, or tantalum carbide. The cooling channels are automatically formed as unbound regions during the printing. After process completion and curing of the polymer binder, the unbound powder is removed from the mold, leaving behind the desired network of channels. The mold is then debound and either sintered directly to full density, or presintered and then infiltrated. In this manner, channel shape and layout can be optimized for heat transfer while avoiding adverse effects to the mechanical integrity of the mold. Both mold inserts and large molds can have cooling channels incorporated therein without compromise to fabrication time.

In order to be effective as conformal cooling channels, the cooling channels must be placed close to the surface of the tool. If the channels are placed far away, they will still withdraw heat. However, there will be a significant temperature difference between the surface of the molding cavity and the coolant. Further, this temperature difference depends on the cycle time, the temperature of the injected plastic, and other process parameters. Thus, as these parameters change, the temperature of the molding cavity changes, an undesirable circumstance.

An approximate value for the maximum distance that a conformal cooling channel may lie from the surface of a molding cavity may be derived by reference to the literature on transient heat transfer. (See, for example, W. Rhosenow and H. Choi, *Heat Mass and Momentum Transfer*, Prentice-Hall, 1961, p. 121.) For example, if a conductive body is at a uniform temperature and its surface is suddenly raised in temperature by an amount $\Delta T$, then heat is conducted into the body. The temperature rises such that at time t, the temperature at a distance $(\alpha t)^{1/2}$ from the surface has risen by approximately $\Delta T/2$, where $\alpha$ is the thermal diffusivity of the body. Thus, if the cooling channels are placed closer to the surface of the molding cavity than $(\alpha \tau)^{1/2}$ where $\tau$ is the duration of the molding cycle per part, the cooling channels can have a substantial effect on the temperature of the cavity during a cycle. For a typical molding cycle of 10 seconds and for a value of $\alpha$ typical of that for stainless steel, this distance is approximately 7 mm.

Figure 15:
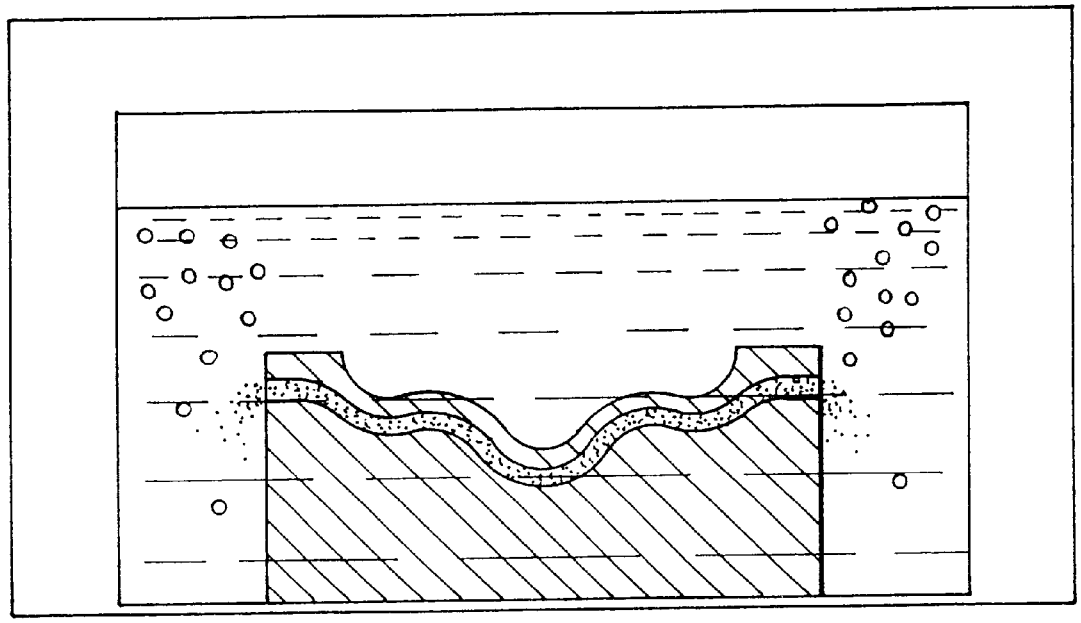
FIG. 15 is a schematic illustration of a system for removing powder from the channels of a printed part.
Figure 16A:
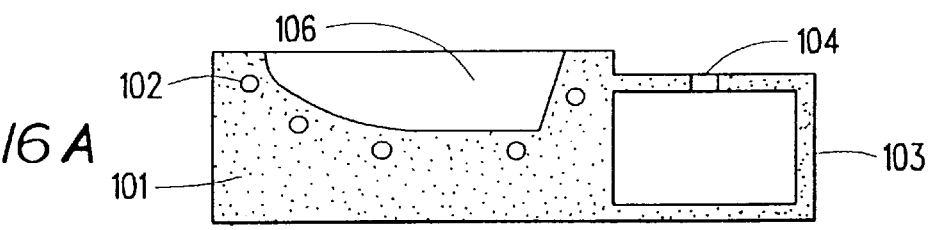
FIGS. 16A, 16B, 16C, and 16D are schematic illustrations of a further infiltration embodiment.
Figure 16B:
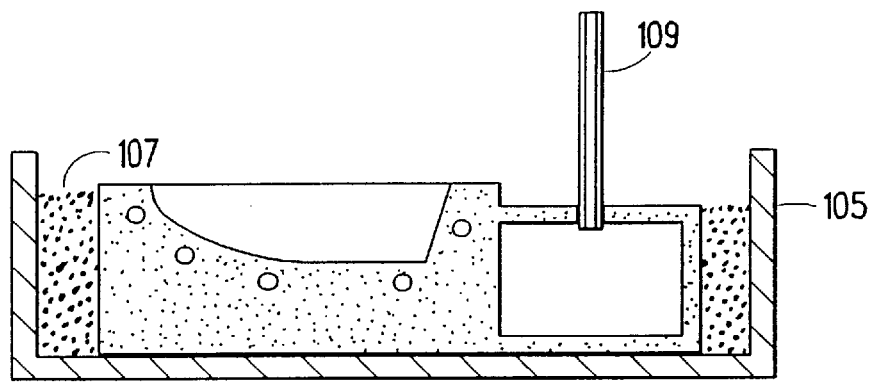
Figure 16C:
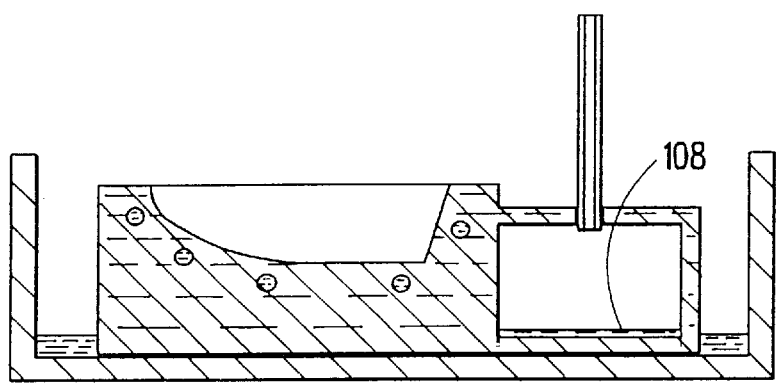
Figure 16D:
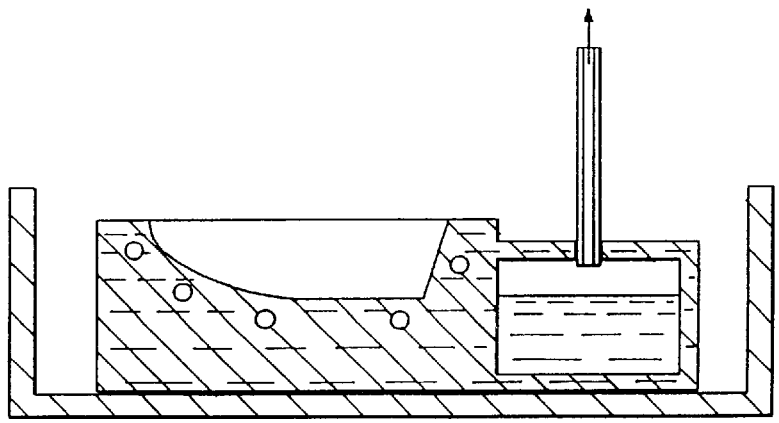

A necessary step in the creation of tooling with conformal cooling channels is to remove the powder from inside the channels. Powder removal may be accomplished using vibration of the green mold, which is sufficient to flow the unbound powder out of the channels. The channels being open at both ends allows for a variety of removal techniques, including blowing with air or vibration. Another useful technique is to immerse the printed component in water charged with $CO_2$ (soda water) within a vessel capable of sustaining a vacuum, as illustrated in FIG. 15. The pressure is then rapidly dropped through the use of a vacuum pump and vacuum reservoir, thereby causing the $CO_2$ to come out of solution. The bubbles thus formed eject the loose powder from the channels.

If infiltration is used to attain full density, inadvertent filling of the cooling channels with infiltrant metal must be avoided, as this would plug the channels. The cooling channels are in effect very large internal pores and can be filled with infiltrant metal by the same mechanism which fills the micro-porosity between the powder particles. One way to avoid channel blockage is to use exactly enough infiltrant material to fill only the micro-porosity between the powder particles. Since infiltrant material will preferentially fill small pores first., the much larger size of the cooling channels will prevent them from being filled.

Figure 10A:
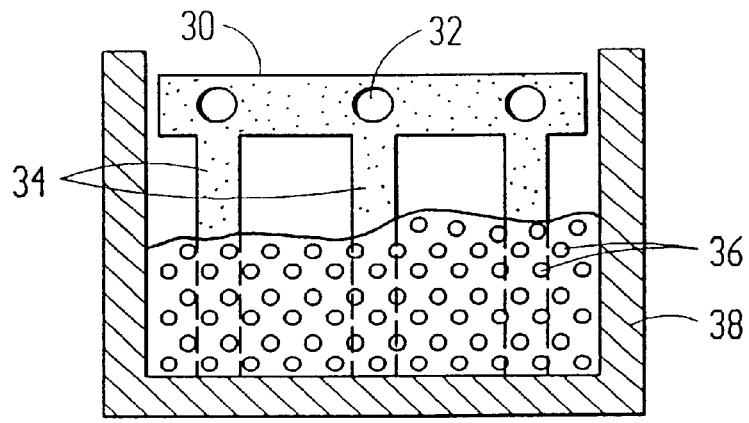
FIGS. 10A, 10B, and 10C are schematic illustrations of a mold infiltrated on stilts.
Figure 10B:
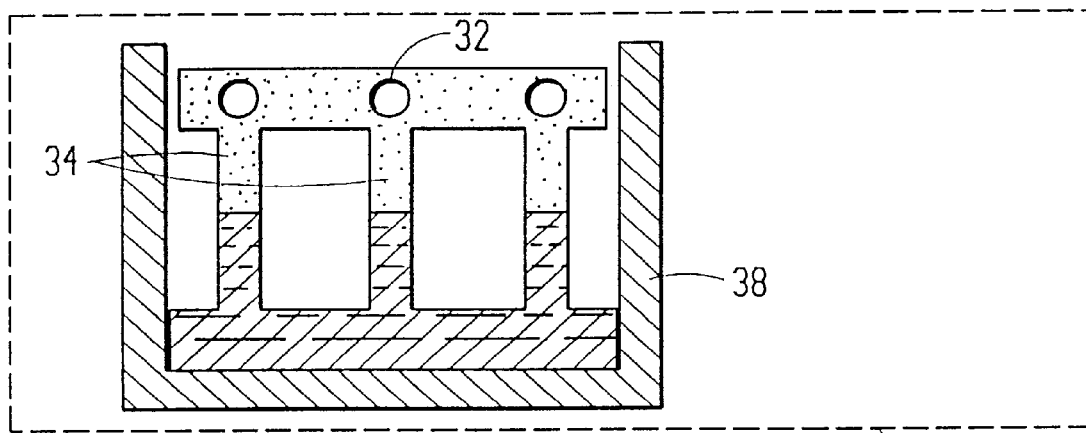
Figure 10C:
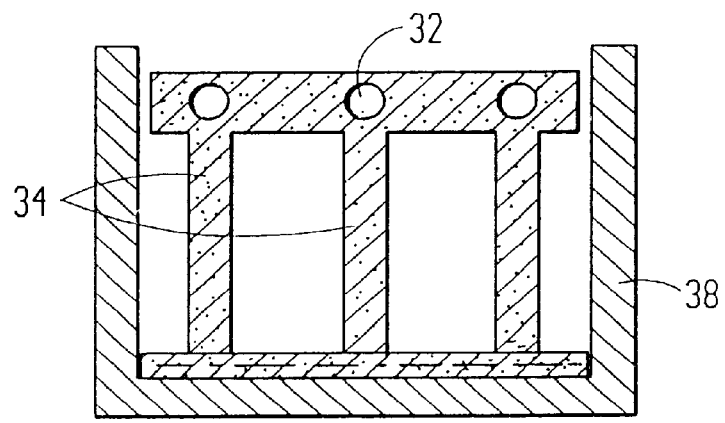

Referring to FIGS. 10A, 10B, and 10C, the cooling channels 32 can also remain free of infiltrant by infiltrating the part 30 placed on stilts 34 to raise the part a predetermined distance above the free surface of a pool of molten infiltrant 36 contained in a crucible 38, which may be an alumina coated graphite. The stilts are preferably fabricated of a powder material similar or identical in composition, size and packing fraction to the material used in the tool itself, such as a stainless steel. The infiltrant, such as bronze, wicks up the stilt by capillarity and then into the body of the tool. The infiltration may be performed, for example, in a furnace 40 supplying an argon/hydrogen atmosphere at an elevated temperature, such as 1100° C. By selecting the height of the stilts properly and considering the size of the cooling channel intended to be kept clear, it is possible to guarantee that no infiltrant enters the cooling channel. As the infiltrant rises to the level, H, above the free melt surface of the infiltrant pool, the hydrostatic pressure within the infiltrant is lower than in the surrounding ambient atmosphere. This hydrostatic pressure differential is given by:

$$\text{Pressure Differential} = \rho g H$$

where $\rho$ is the density of the molten infiltrant, and g is the acceleration of gravity. The maximum capillary rise in a circular channel of radius r is given by:

$$H = \frac{2\gamma \cos\theta}{\rho g r}$$

where $\gamma$ is the surface tension of the liquid (molten infiltrant) and $\theta$ is the contact angle of the liquid against the walls of the channel. (See, for example, *Fluid Flow*, Sabersky, Acosta and Hauptmann, Macmillan, 1971, p. 14.) Thus, if the stilt height is designed to ensure that a cooling channel of radius r is more than the distance H above the free melt surface, the infiltrant does not fill the cooling channel.

This rule of thumb for determining the needed stilt height is meant as an approximate indication. The exact minimum height needed may depend on the shape and orientation of the cooling channels. For example, a horizontal channel may be more resistant to filling than a vertical channel and the minimum stilt height may thus be less, since the ratio of perimeter to cross section for a horizontal channel is lower than for a vertical channel.

As a typical example, consider a bronze infiltrant undergoing capillary-driven infiltration of a porous stainless steel skeleton where the powder size of the stainless steel is 50 microns in diameter and the powder is packed to approximately 60% by volume. For a typical bronze, the density of the molten infiltrant is 8800 $Kg/m^3$, the surface tension is 1 N/m, and the contact angle is close to zero. The capillary rise possible within the body of the perform itself, where the size of the pores between the powder is approximately 10 microns in radius, may be calculated to be 2.3 m. In other words, the capillary rise within a porous body would be sufficient to ensure the full infiltration of a sample more than 2 meters tall. In contrast, if the smallest cooling channel was 1 mm in diameter, the maximum capillary rise would be 22 mm. In this case, a stilt of height greater than 22 mm would be sufficient to ensure that the cooling channel would not fill, while the bulk of the part would fill.

The stilts may be prepared independently of the part, either by three dimensional printing or by conventional powder metallurgy techniques. Alternatively, the stilts may be created by printing them integral to the part itself. The stilts provide a further advantage in assuring knowledge of the entry point of the infiltrant into the part to be infiltrated. It may be desirable to control how the infiltrant front advances, and this provides a method to exercise such control.

The stilts also serve an important function in pre-alloying the infiltrant. Generally, the infiltrant is able to dissolve some of the powder material, thus causing some erosion of the powder perform. This erosion can continue until the concentration of the dissolved powder in the infiltrant reaches a limit imposed by the particular materials. If the pool of molten infiltrant is placed in intimate contact with the part to be infiltrated, the part itself will erode as the infiltration takes place. However, if the part is placed on stilts, the erosion can be entirely confined to the stilts themselves. By the time the melt reaches the part, the melt will be saturated and will dissolve no more powder. While in principal it is possible to pre-alloy the infiltrant with the powder material so that it is saturated, in practice it is difficult to get precisely the right concentration, as this pre-alloying is typically done in a separate furnace operation and the temperature may be different than the infiltration temperature. Having the pre-alloying done by the stilts themselves guarantees the right concentration in the infiltrant. This is especially the case if the stilts are made of the same powder used to create the part.

The key to maintaining the internal structure clear of infiltrant is to establish a pressure differential between the ambient atmosphere and the infiltrating melt front. Creating this pressure differential by hydrostatic head is one option. Another option is to create such a pressure differential by the selective application of gas pressure.

This pressure differential can be created by the embodiment illustrated in FIGS. 16A through 16D, which show a perform for a tooling insert 101 which is made by three dimensional printing. Such a part might be printed of tool steel or tungsten carbide powder. The perform has a molding cavity 106 and cooling channels 102. The cooling channels must be free of infiltrant in the final product. Toward this end, the part includes a box 103 with a hole 104 to aid in the infiltration process, as discussed below. The perform may be created with a polymeric binder, debound, and lightly sintered as previously described.

The perform is placed in a crucible 105, for example, an alumina crucible, in a furnace (not shown). Infiltrant alloy 107 is then placed in the bottom of the crucible. For example, a bronze alloy can be used in the form of a coarse powder. A tube 109 such as a stainless steel tube is inserted into the hole 104 in the perform 101. The tube, or some extension of it, can extend through the wall of the furnace and be supported by a fitting which seals its outside diameter to the wall of the furnace. The furnace is then filled with an inert gas such as argon, and either argon can also be admitted through the tube or a suction can be applied to the tube so that furnace gases are pulled out through the tube, either method guaranteeing that air is not admitted through the tube. Alternatively, a vacuum can be applied to the furnace if the internal diameter of the tube is sealed outside the furnace.

The furnace is then heated up and the infiltrant is melted. The infiltrant wicks through all of the part 101 and may fill some or all of the channels 102, depending on their size and height above the free surface of the melt. The box 103 only partially fills with the infiltrant, as it is wide enough to prevent full capillary infiltration. The infiltrant rises to the level 108, slightly higher than the free melt surface of the infiltrant, the amount above the free melt surface being determined by the width of the box. The infiltrant also wicks through the walls of the box 103 and seals the tube 109 to the perform. At this point, if the infiltration was done under vacuum, an inert gas is admitted to the furnace until the pressure is close to atmospheric. A partial vacuum is now applied to the tube 109 from outside the furnace using a small vacuum pump. This vacuum draws the residual molten infiltrant from outside the part 101 and from within the cooling channels 102, and the melt level within the box 101 rises until these two sources of molten infiltrant are depleted. The infiltrant does not drain from the body of the part 101, because the meniscus of the molten infiltrant attached to the powder can sustain a substantial pressure differential across it. The furnace is cooled and the part removed. The box 103 and its content of infiltrant alloy can then be removed by machining.

Figure 17:
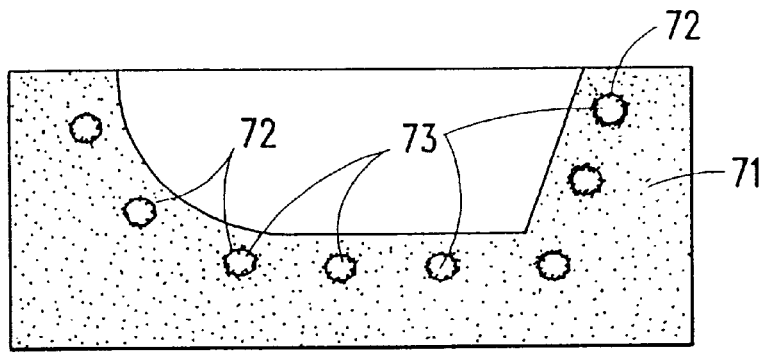
FIG. 17 is a schematic illustration of an infiltration stop.

Another method of preventing infiltrant filling of cooling channels involves the selective printing of an infiltration stop material. In this case, two different materials are dispensed through the printhead during the printing of the part. Referring to FIG. 17, the first material is a conventional polymeric binder 71 which defines the green part geometry and provides the green part with cohesive strength. The second material is an appropriate permanent binder material 72 which is printed into the regions of the powder bed forming the walls of the cooling channel 73. This binder is intentionally chosen so that it remains in the powder bed during firing and prevents the infiltrant material which will be used during post-processing from filling these regions by creating a surface on the powder which is not wetted by the molten infiltrant. Such non-wetted agents may be applied to the surface of the channel which is to be kept free of infiltrant. Alternatively the anti-wetting agent can be applied throughout the volume of the channel. In both cases, this anti-wetting agent can either remain in the tool or can be removed from the tool after the infiltration step by etching. The etching step is suitable to particular formulations of anti-wetting agent material. For example, silica can be etched in hot sodium hydroxide or potassium hydroxide, which also leaves many metal alloy systems unaffected. The part is removed from the powder bed after printing, and loose powder is removed from the cooling channels by gentle vibration. During post-processing, the infiltration stop material remains resident in the walls of the cooling channels, preventing infiltrant penetration into the channels.

An example material system for this process is 60 $\mu$m stainless steel powder, a polymeric binder, colloidal silica binder and bronze infiltrant. The colloidal silica binder is printed into the channel walls, locally coating the stainless steel powder and forming an infiltration stop barrier. The silica also effectively prevents any sintering from occurring in the printed regions during firing. The silica binder remains resident during firing and prevents the liquid bronze from wicking into the channel walls. Other ceramic colloids or slurries, for example, colloidal alumina or suspensions of fine silica or alumina particles, can be used as infiltration stops.

In another variation, the cooling channel area is increased by printing the conventional binder in the areas which are to become cooling channels as well. In this embodiment, infiltration stop material is only printed into those regions of the green part which are to act as porous cooling channels after the part has been completely post-processed. After printing is completed, the green part is removed from the powder bed. The cooling channels remain filled with the powdered metal of which the rest of the three dimensional printed green part is composed. During the post-processing sequence, the polymeric binder is removed by thermal decomposition, while the infiltration stop material remains. After lightly sintering the green part, the metal skeleton is infiltrated with a lower melting point alloy. The infiltration stop prevents the infiltrant material from entering the interstices of those areas which are to become porous cooling channels. In this manner, the cooling channels are left as porous passages, while the remainder of the tool volume becomes a fully dense material. The infiltration stop material can also be formulated to allow a slight amount of sintering during firing, thus allowing the porous channels to be strengthened and resist the pressure associated with coolant flow through the channel. An additional advantage of this method to increase cooling channel surface area is that the loosely sintered porous matrix can provide additional mechanical support and load bearing capacity to resist tool deflection during the high pressure cycle of injection molding. Typical cooling channels, being completely open, can support no mechanical load.

Figure 6:
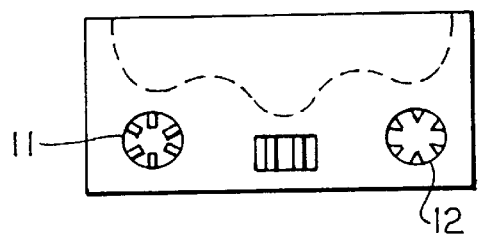
FIG. 6 is a schematic illustration of a mold incorporating heat transfer elements inside the coolant channels according to the present invention.
Figure 7:
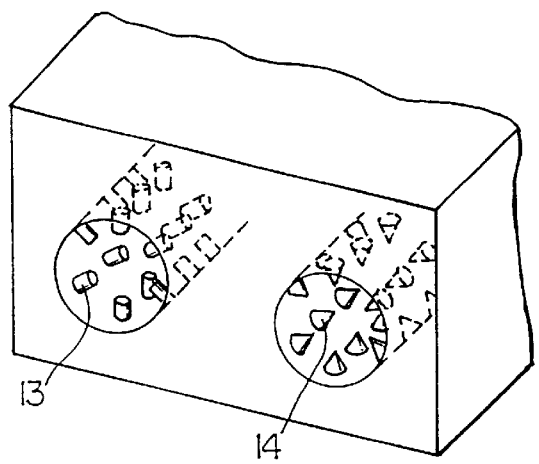
FIG. 7 is a schematic illustration of a mold incorporating further heat transfer elements inside the coolant channels according to the present invention.

Another aspect of the present invention provides an increase of the effective heat transfer surface area for a cooling channel of a given nominal diameter by a modification of the wall geometry of the cooling passage to maximize surface area for a given nominal diameter. FIGS. 6 and 7 show cooling channel geometries which have been optimized for high surface area. Lining the walls of the channel with radial fins 11 or other geometries 12 greatly increases surface area. The application of textures, such as short stubs 13 or mounds 14, also increases surface area. Additionally, irregular textures induce turbulent flow in the coolant, thereby increasing mixing and overall heat transfer. One manner of creating these surface geometries is to incorporate them into the mold CAD model and then to three dimensionally print the mold. Textures of varying complexity, such as the inclusions of overhangs and undercuts, are thereby automatically incorporated into the mold cooling passages.

Figure 8:
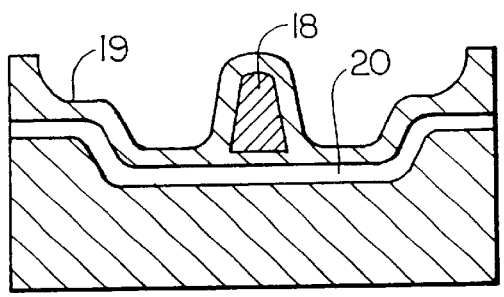
FIG. 8 is a schematic illustration of a mold incorporating a high thermal conductivity material according to the present invention.

The ability of the three dimensional printing process to selectively deposit different materials throughout the volume of a tool allows for the creation of areas composed of high thermal conductivity material embedded in a matrix of high strength and hardness. As shown in FIG. 8, thermal paths 18 are embedded in the tool volume. Such paths may be placed in regions 18 which are not easily accessed by cooling channels. Since the thermal paths do not extend completely to the inner mold surface 19, the hardness and abrasion resistance of the mold surface is not compromised. One method of creating high thermal conductivity paths is to selectively print a slurry which contains sub-micron sized particles of a high thermal conductivity material, such as copper or silver, into those regions of the tool volume which are to have enhanced thermal conductivity. The copper particles will fill the void spaces between the powder particles in the spread layer and become incorporated into the finished tool during post-processing. The tool may be sintered or infiltrated as described above. In this manner, selected regions of the tool have increased thermal conductivity. These high thermal conductivity paths can extract heat from near the mold surface and deliver it to the underlying conformal cooling passages 20. Also, gradual compositional gradients can be incorporated into the tool volume to minimize local stresses caused by local variations in the coefficient of thermal expansion and to increase the overall toughness of the tool.

Figure 13:
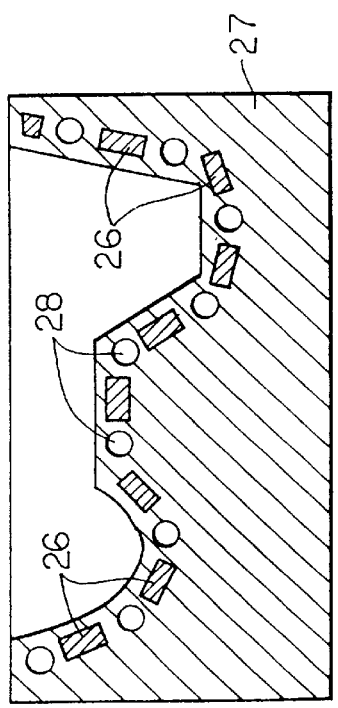
FIG. 13 is a schematic illustration of tooling containing buried pockets of a high thermal conductivity material.

Another aspect of the current invention is to create pockets 26 of high thermal conductivity material within the body 27 of the tool, shown in FIG. 13. Such pockets of high thermal conductivity can be created by first removing the powder from the region which is to become a pocket and then filling the pocket with infiltrant. For example, if a tool is fabricated by creating a porous skeleton of steel powder and infiltrated with a copper alloy, the high thermal conductivity of the copper alloy will provide the desired benefit when a pocket is fully filled with the copper alloy. Such pockets can be buried within the tool so that the surface of the tool is composed of the harder combination of powder and infiltrant, while the buried pocket provides a region of high thermal conductivity. As an example, the powder used for the porous skeleton can be stainless steel or tool steel powder. The infiltrant can be a chrome copper or a beryllium copper alloy, both of which are known to combine reasonable hardness with a high thermal conductivity.

Figure 14A:
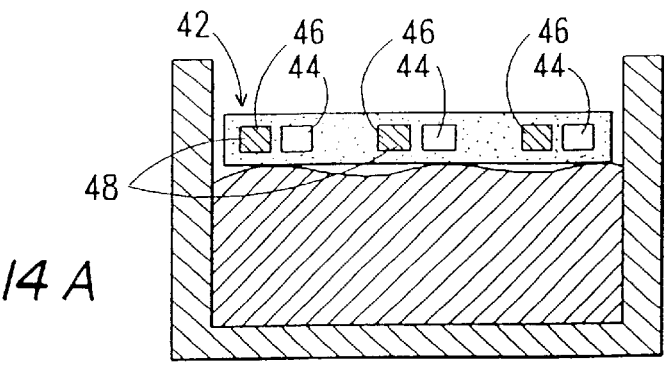
FIGS. 14A, 14B, 14C, and 14D are schematic illustrations of a process for forming the buried pockets of FIG. 13.
Figure 14B:
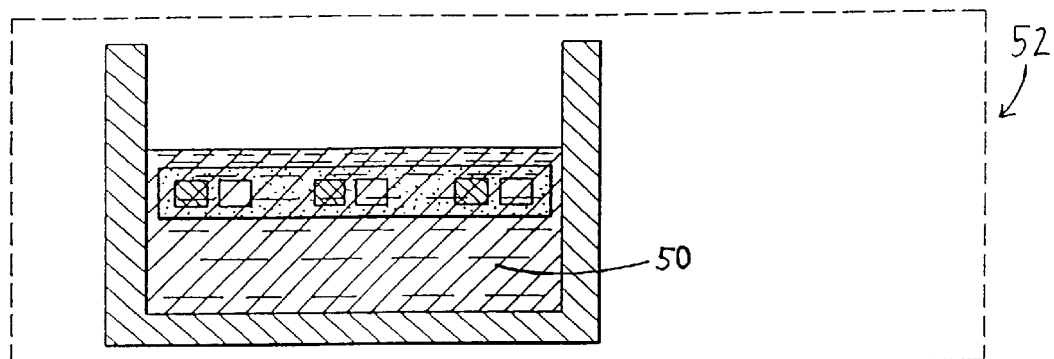
Figure 14C:
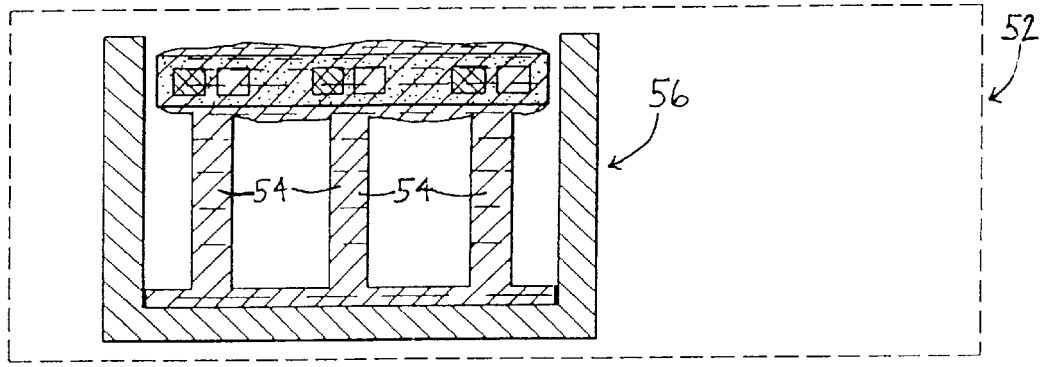

Such buried pockets 26 can be usefully deployed in the region between conformal cooling channels 28, shown in FIG. 13, as they will tend to conduct the heat from the regions between cooling channels to the channels. This creates the challenge of infiltrating a tool so as to fill buried pockets with infiltrant, but guaranteeing that cooling channels, which might be of similar size or smaller, remain free of infiltrant. Referring to FIGS. 14A through 14C, one method to accomplish this is the following:

1) Print a part 42 by printing a binding agent, but do not print the binding agent where the cooling channels 44 and buried pockets 46 are to be located. The cooling channels, by the nature of their function, have openings from which powder can later be removed. The buried pockets must also be printed with at least one opening to the outside of the part so that the powder can be removed from inside.

2) Remove the powder from inside the cooling channels and the buried pockets.

3) Seal the opening of the buried pocket to the outside of the part. This may be accomplished for example by applying a paste of powder and binder 48, preferably the same powder and binder used to create the part.

4) Infiltrate the part with molten metal infiltrant 50. In order to guarantee that the buried pockets fill with metal, the part may need to be immersed in molten infiltrant, shown in FIG. 14B, since the size of the buried pocket may prevent it from filling by capillarity, depending on its height above the free melt surface. This infiltration step is best performed in a chamber 52 under vacuum conditions at an elevated temperature, such as 1100° C., to eliminate the possibility of trapping gas inside the buried pocket, which trapped gas would prevent complete infiltration of the pocket. During this infiltration step the cooling channels fill with infiltrant as well.

Figure 14D:
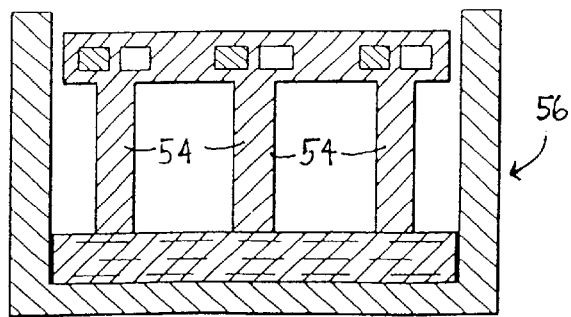

5) Drain the infiltrant from the cooling channels by placing the part on stilts 54 in a furnace 56, illustrated in FIG. 14C. The cooling channels which are open to the outside of the part will admit gas which will allow the channels to drain, illustrated in FIG. 14D; however, the closed buried pockets will have no such path for the admission of gas, and hence, these channels will not drain. It is possible to combine this step with step 4 by performing the submerged infiltration of step 4 with the part on stilts in a crucible from which the infiltrant can then be drained, resulting in the draining of the cooling channels.

Other methods are possible for the creation of buried pockets. For example, the porous perform can be created as in steps 1 through 3 above. A stilt infiltration can then be performed under vacuum which results in the infiltration of the body of the part around the buried pocket, but not the buried pocket itself, as the larger size of this pocket will prevent infiltration. While the infiltrant is still molten, the furnace is raised to a higher pressure, for example 10 atmospheres of argon, which results in filling of the buried pocket by flow of the molten infiltrant into it. The pressure must be sufficient to overcome the capillary retention of the infiltrant and cause it to flow into the pocket. Another alternative would be to use a high-conductivity material with a lower melting point in a second infiltrant.

Figure 9:
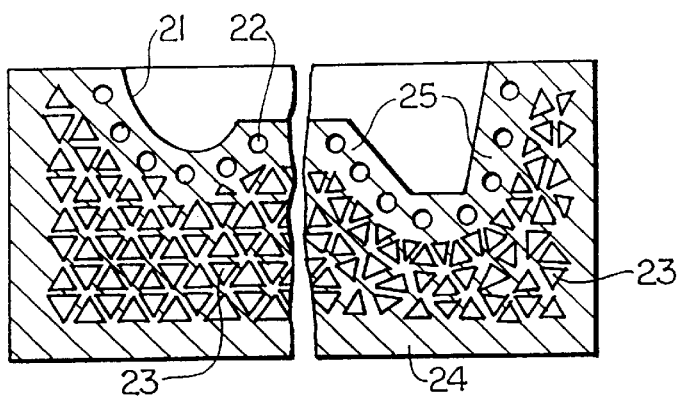
FIG. 9 is a schematic illustration of a mold having a reduced thermal mass from a cellular truss structure according to the present invention.

In some processes, rapid thermal cycling may require a tool to undergo a temperature difference of 100 to 200° C. within 1 to 5 seconds. One approach to implementing fast thermal cycling is to reduce the mold's thermal mass to provide a region of low thermal inertia and to insulate the mold from its support structure. As illustrated in FIG. 9, a method of accomplishing both these tasks is to back the mold surfaces 21 and conformal cooling channels 22 with a cellular structure. Conformal cooling channels can be placed in close proximity to the surface of the tool within a shell 25 of minimum thickness. Typically, the cooling channels have a diameter of 3 mm and the shell has a thickness of 8 mm.

Figure 20:
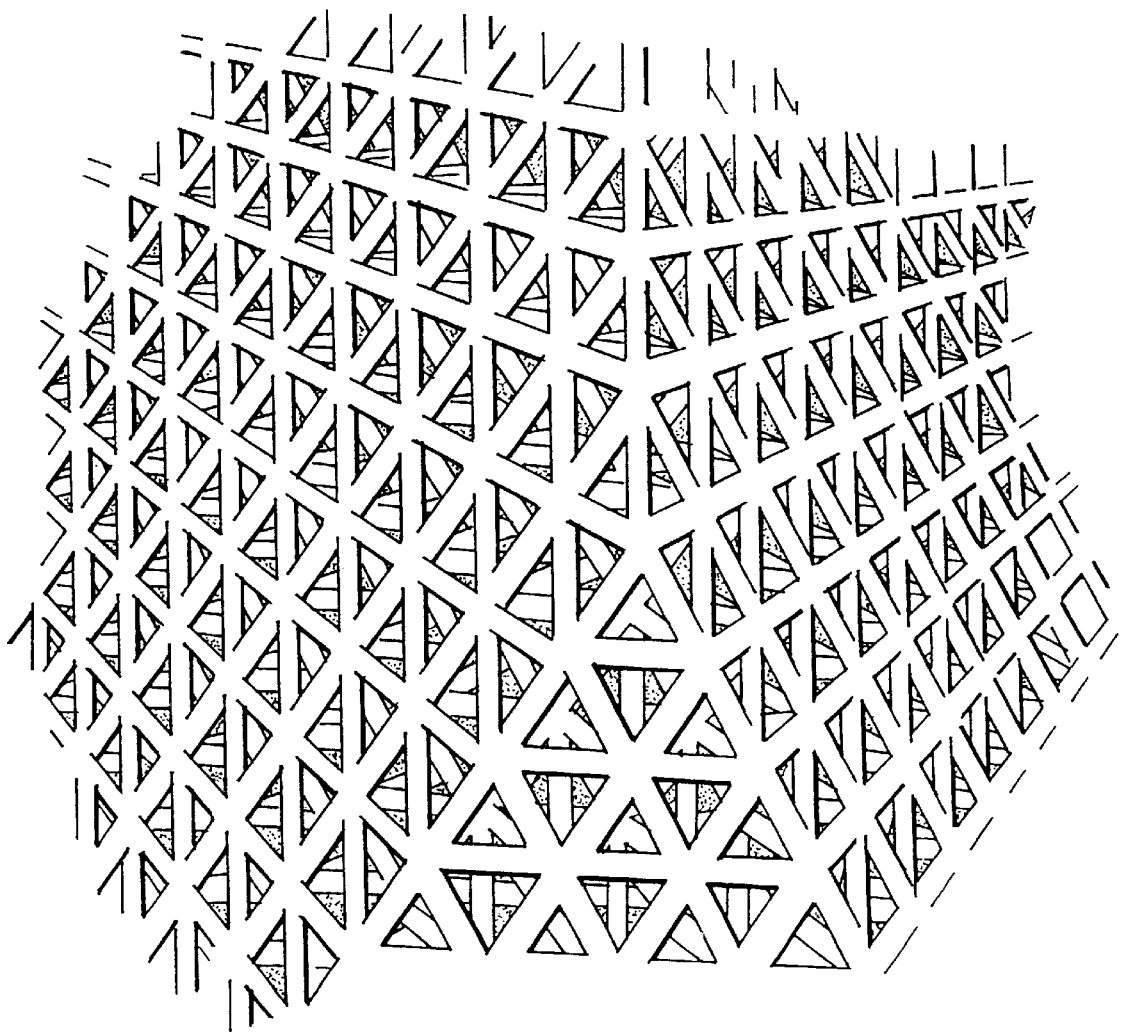
FIG. 20 is a schematic illustration of a three-dimensional truss structure forming a reduced thermal mass portion of a mold according to the present invention.

The cellular structure 23 eliminates the majority of the metal mass from the mold volume 24 while providing mechanical support to the mold surfaces. Whereas heat transfer between the mold surfaces and the conformal cooling channels is unaffected by the cellular structure, heat transfer from the cooling channels to the body of the mold is greatly reduced, because of the decrease in thermal mass and the increase in thermal resistance which the cellular structure brings about. The cellular structure thermally isolates the mold surfaces and cooling channels from the body of the mold. The thermal mass which must be cycled by the heating/cooling system is now reduced to approximately the shell 25 which defines the mold cavity 21 and encompasses the cooling channels 22. This substantially reduces the heat transfer requirements of the heating/cooling system and makes rapid thermal cycling of the mold surface possible. The cellular structure 23 may be regular, as shown on the left side of FIG. 9, or may be more irregular to conform to the configuration of the mold surface and the shell, as shown on the right side of FIG. 9. The cellular structure may have a three-dimensional form, as illustrated in FIG. 20.

Although a cellular structure of this type would be very difficult to incorporate in a standard mold because of the multiplicity of cells and their irregular shape, such a structure is readily incorporated into a mold made with the three dimensional printing process. Cellular regions, designed to be sufficiently strong to resist pressures of fabrication and operation, are defined in the CAD file and result in unprinted regions in the green part. Unbound powder is removed from the green part, resulting in an open cellular structure. A requirement of the structure, therefore, is that the cells form an open network, so that the unbound powder can be removed. The part then may be sintered or infiltrated to achieve full density. The cellular structure can be conformal in shape to the mold surface and cooling channels to maximize the reduction in thermal mass and to maximize the structural integrity. The cellular structure can be incorporated into the mold without adversely effecting the mold core and cavity geometry or mechanical properties.

An added advantage is the ability of such a cellular structure to accommodate situations in which different members are at different temperatures, as happens in normal operation of a rapidly thermally cycled tool. It is known that cellular solids in general exhibit thermal shock resistance which is superior to a solid piece of the bulk material of which the cellular solid is made. (See, for example, *Cellular Solids. Structure and Properties*, L. Gibson and M. Ashby, Pergamon Press, p. 208.) Fundamentally this improved thermal shock resistance is due to the ability of the cellular material to respond by bending. Such increased resistance to thermal shock may be of particular value in die casting of metal parts.

The cellular structure can, for example, be designed as a triangulated, pyramidal truss structure. Such a structure provides a small area for conduction down the length of the truss element and guarantees that the support members are, to the maximum extent possible, in a purely compressive or tensile state of stress, with no bending moments present. Further, the presence of the cross members guarantees that the support members will not collapse by buckling. The minimum cross sections of the truss elements will be determined by structural requirements in view of the loads anticipated during operation of the tool.

Figure 18:
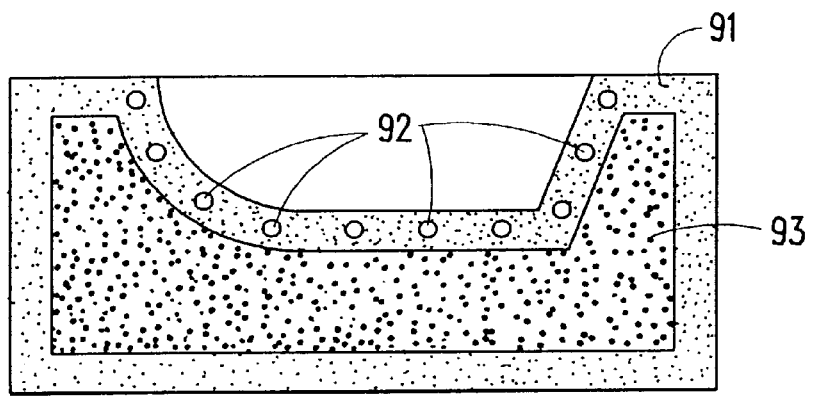
FIG. 18 is a schematic illustration of a thermal inertia backing material.

Such a structure which combines conformal cooling channels and truss structures can be created by printing binder where the body of the part and the truss are to be formed and by not printing binder where the cooling channels and region between the truss structure are to be formed. The loose powder is then removed from within the cooling channels and from around the truss structure. The structure is then sintered or infiltrated by capillarity as described previously. An alternate way to provide a mold with reduced thermal mass is to provide by three dimensional printing a shell 91 with conformal channels 92 within it. Rigid and low thermal inertia backing material 93 can then be filled in behind the shell 91 in order to provide the requisite strength and stiffness, as illustrated in FIG. 18. A suitable filler material is a chemically bonded ceramic or a filled epoxy.

Figure 12:
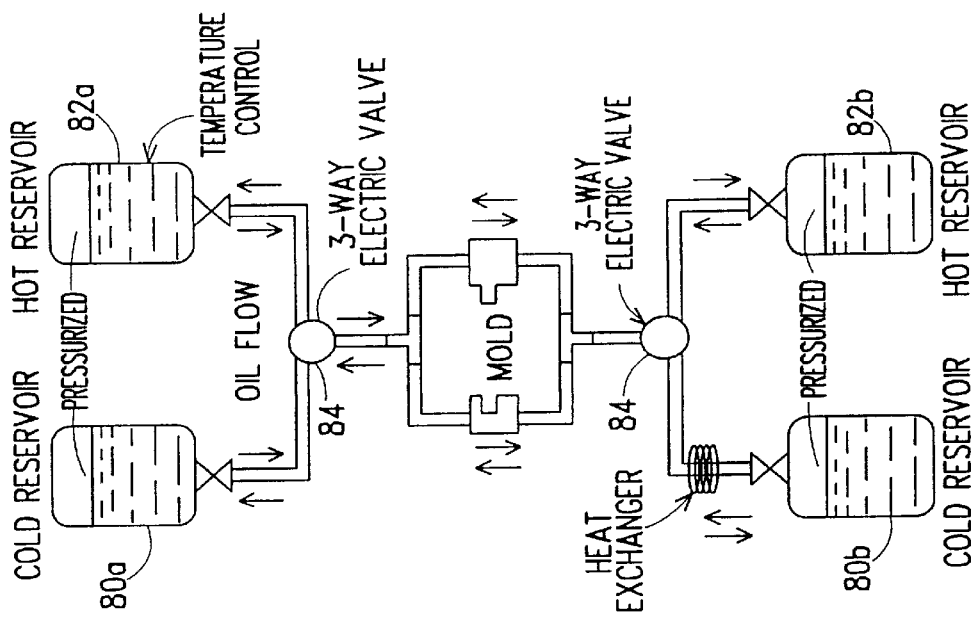
FIG. 12 is a schematic illustration of a further multiple reservoir system for operation of a mold for rapid thermal cycling.
Figure 11:
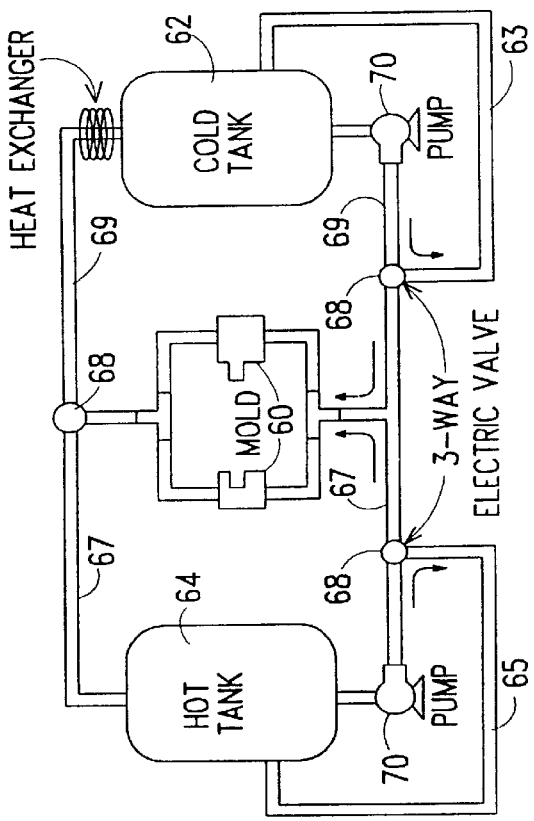
FIG. 11 is a schematic illustration of a multiple reservoir system for operation of a mold for rapid thermal cycling.

A further aspect of the present invention relates to the control during use of the temperature of a tool 60 designed for rapid thermal cycling. In the simplest implementation, shown in FIG. 11, two reservoirs of oil are maintained, one 62 at, for example, 50° C. and the other 64 at, for example, 200° C. The oils may be continuously circulated by pumps 70 on flow paths 63 and 65 respectively. Prior to injection of the plastic, the hot oil is run via flow path 67 through the channels within the mold, the plastic is then injected, and the cold oil is then circulated via flow path 69 through the mold's channels to cool the mold. Valving, such as three-way valves 68, may be provided to direct the oil along the appropriate flow paths. The part is ejected and the cycle is repeated. A suitable high temperature oil for heat transfer applications is Multitherm 503 available from Multitherm Corp. The oils may be moved through the mold from the reservoirs using the pumps 70. The oils may also be moved by pressurizing pairs of reservoirs 80a, 80b, 82a, 82b with gas, as shown in. FIG. 12. In this case, opening the appropriate three-way valves 84 transfers the oils back and forth between their respective reservoirs.

Figure 19:
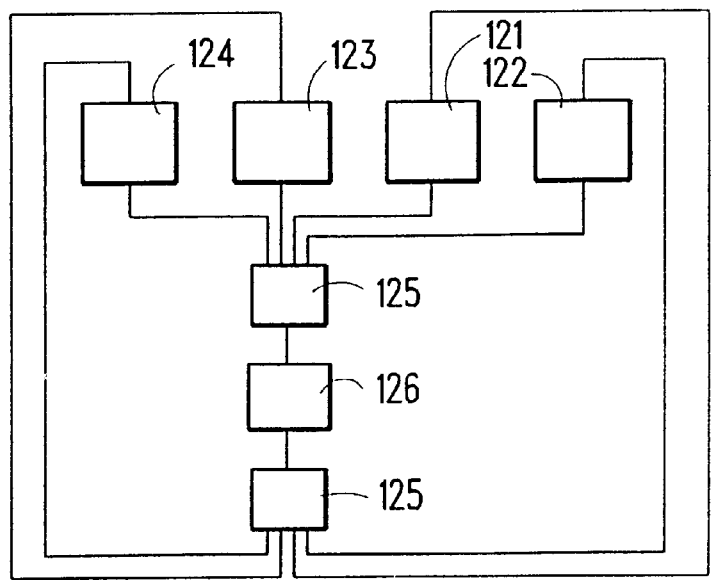
FIG. 19 is a schematic illustration of a further embodiment of a multiple reservoir system for operation of a mold for rapid thermal cycling.

Additionally, it is frequently desirable to exert greater control over the temperature history of the tool than is possible with just two reservoirs, one at a high and one at a low temperature. For example, during the cool down, it may be desirable to drop the temperature as a prescribed function of time and not all at once in a step change, to obtain the minimum state of residual stress in a part. Also, when heating the mold, it is not necessary to follow a prescribed time history as there is no plastic present in the mold. However, it is desirable to heat the mold up as fast as possible and to a uniform and well controlled temperature. If a single reservoir of oil is used, the oil will suffer some reduction in temperature in the plumbing on the way to the tool. Further, the temperature of the tool can at best be expected to respond with an exponential rise in temperature which asymptotically approaches the temperature of the hot oil. Thus, some amount of time will have to pass before the temperature of the tool is effectively at the temperature of the hot oil. A solution is to exert control over the temperature over time, for example, by providing multiple reservoirs at multiple temperatures. Referring to FIG. 19, a reservoir 121 can be used to provide oil at 210° C. for a short time and then a switch via appropriate valving 125 can be made to a reservoir 122 providing oil at 200° C., the desired temperature of the mold 126 prior to injection. This will provide a more rapid heat up. In cooling down, the flow can be switched among reservoirs 123, 124 each of successively lower temperature. Any appropriate number of reservoirs can be used. Valves to mix the oils from various reservoirs can also be provided to obtain oil at intermediate temperatures. Another way is to provide for on-demand heating and cooling of the oil as it flows through the system.

Another manner of creating tooling with conformal cooling channels is by the electroforming process. In this case, a nickel shell can be electroformed onto a positive form, as is conventional practice described above. The cooling channels can then be formed by depositing onto the surface of the nickel shell a sacrificial material in the form of beads. This material may be a polymeric or wax material, for example, applied by a hot extrusion technique, or it may be a low melting point metal, such as a solder. The electroforming process is continued, adding material to the thickness of the shell and over the beads of the sacrificial material. If the sacrificial material is a polymer, it will have to be rendered conductive through the use of electroless plating techniques as is well known in the art of plating. This additional electroformed material can be copper to provide a higher thermal conductivity. Finally, the sacrificial material is removed, by melting in the case of the low melting point metal or by melting, dissolving, or burning in the case of the polymeric materials.

The capabilities described above make tooling produced by SFF fabrication techniques such as three dimensional printing superior to tooling produced by conventional methods. These capabilities can be utilized in a variety of ways depending on the specific tooling application. Also, although the invention is particularly suited for three dimensional printing techniques and is described in relation to such techniques, other methods, such as selective laser sintering, can also be used to create tooling directly from a computer model. It will be appreciated that the thermal modifications of the present invention can be applied to tooling made directly from a computer model regardless of the process used. Additionally, the tooling so made can be used for a wide range of fabrication processes.

The invention is not to be limited by what has been particularly shown and described, except as indicated by the appended claims.

We claim:

1. A process for fabricating a part made of a molding material, by means of a molding cycle having a duration of $\tau$ per part to be molded, said process comprising the steps of:

a. providing tooling having a thermal diffusivity of $\alpha$, a mold surface and an internal heat transfer channel through said tooling, said channel being spaced from said mold surface a distance less than twice $(\alpha\tau)^{1/2}$;

b. providing said molding material to said tooling so that it contacts said mold surface;

c. providing heat transfer fluid to said heat transfer channel to facilitate exchange of thermal energy between said tooling and said fluid during said molding cycle; and d. removing from said tooling at a time interval of $\tau$, a formed part.

2. The process for fabricating a part of claim 1, said providing tooling step comprising providing tooling having a heat transfer channel that is spaced from said mold surface a distance less than $(\alpha\tau)^{1/2}$.

* * * * *